United States Patent
Tabone et al.

(10) Patent No.: US 9,189,340 B2
(45) Date of Patent: *Nov. 17, 2015

(54) SECURE RECOVERY APPARATUS AND METHOD

(71) Applicant: Google Inc., Mountain View, CA (US)

(72) Inventors: Ryan Tabone, San Francisco, CA (US); Randall R. Spangler, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/249,330

(22) Filed: Apr. 9, 2014

(65) Prior Publication Data

US 2014/0223163 A1  Aug. 7, 2014

Related U.S. Application Data

(63) Continuation of application No. 13/211,271, filed on Aug. 16, 2011, now Pat. No. 8,732,527.

(51) Int. Cl.
*G06F 11/00* (2006.01)
*G06F 11/14* (2006.01)
*G06F 11/16* (2006.01)

(52) U.S. Cl.
CPC ........ *G06F 11/1417* (2013.01); *G06F 11/1666* (2013.01)

(58) Field of Classification Search
USPC ............................................ 714/36; 713/1, 2
See application file for complete search history.

(56) References Cited

U.S. PATENT DOCUMENTS

| | | | |
|---|---|---|---|
| 6,625,754 B1 | 9/2003 | Aguilar et al. | |
| 6,665,813 B1 | 12/2003 | Forsman et al. | |
| 7,590,837 B2 * | 9/2009 | Bhansali et al. | 713/2 |
| 7,809,836 B2 | 10/2010 | Mihm et al. | |
| 7,877,639 B2 * | 1/2011 | Hoang et al. | 714/36 |
| 8,386,763 B1 * | 2/2013 | Spangler et al. | 713/2 |
| 8,712,968 B1 * | 4/2014 | Chester et al. | 707/649 |
| 8,812,854 B2 * | 8/2014 | Shah et al. | 713/176 |
| 2003/0028800 A1 * | 2/2003 | Dayan et al. | 713/200 |
| 2003/0163753 A1 | 8/2003 | Lu et al. | |
| 2004/0268141 A1 * | 12/2004 | Zimmer et al. | 713/200 |
| 2006/0026462 A1 * | 2/2006 | Zhang et al. | 714/36 |
| 2008/0148038 A1 * | 6/2008 | Abe et al. | 713/2 |
| 2008/0165952 A1 * | 7/2008 | Smith et al. | 380/28 |
| 2008/0165971 A1 * | 7/2008 | de Cesare et al. | 380/277 |
| 2009/0158020 A1 * | 6/2009 | Chen et al. | 713/2 |
| 2010/0205423 A1 * | 8/2010 | Shao et al. | 713/2 |
| 2010/0299560 A1 * | 11/2010 | Lin | 714/15 |

(Continued)

FOREIGN PATENT DOCUMENTS

| | | |
|---|---|---|
| WO | WO-2011/047061 | 4/2011 |
| WO | WO-2011/047078 | 4/2011 |

*Primary Examiner* — Kamini Patel
(74) *Attorney, Agent, or Firm* — McDermott Will & Emery LLP

(57) ABSTRACT

A system and method is disclosed for recovering a boot image from a secure location. Hardware instructions initiate a sequence of boot cycles to launch a computer operating system on a computer-enabled device. During the boot cycles, multiple levels of boot code are verified and a determination is made whether each level is usable by the device. If a level of boot code is determined to be unusable, a secure copy of the boot code is loaded from a secure read-only location to repair the unusable code to launch the computer operating system.

20 Claims, 4 Drawing Sheets

(56) References Cited

U.S. PATENT DOCUMENTS

| | | |
|---|---|---|
| 2011/0087870 A1 | 4/2011 | Spangler et al. |
| 2011/0087872 A1 | 4/2011 | Shah et al. |
| 2011/0087920 A1* | 4/2011 | Hendricks et al. ............ 714/21 |
| 2011/0093741 A1* | 4/2011 | Liang et al. ................... 714/6.1 |
| 2011/0138220 A1* | 6/2011 | Gough .......................... 714/5.1 |
| 2012/0011393 A1* | 1/2012 | Roberts et al. ................ 714/6.3 |
| 2013/0047031 A1* | 2/2013 | Tabone et al. ................. 714/15 |

* cited by examiner

SECURE RECOVERY APPARATUS AND METHOD

CROSS-REFERENCE TO RELATED APPLICATIONS

The present application is a continuation of U.S. patent application Ser. No. 13/211,271 entitled "Secure Recovery Apparatus and Method," filed on Aug. 16, 2011, the disclosure of which is hereby incorporated by reference in its entirety for all purposes.

TECHNICAL FIELD

The subject technology relates generally to computer recovery systems and methods, namely recovering an operating system or firmware.

BACKGROUND

Some computers (for example, notebooks) support a recovery mode, which is capable of restoring a computer back to a good state when its rewritable operating system and/or firmware becomes corrupted or compromised. Generally, a user initiates a recovery mode via a keystroke on boot-up of the computer. In some cases, the notebook can initiate the recovery mode on its own, if it determines there is a problem with the firmware and/or operating system. While the foregoing solution has been the mainstream approach, the user nevertheless needs a separate recovery device. If the user doesn't have a recovery device (SD card or USB stick), the user must create one by downloading and running an installer on a second computer. After the recovery device is inserted, the system will boot from recovery device and attempt to repair itself. If the user has an old recovery device, the user must first manually update it.

SUMMARY

The subject technology provides a device and method for loading a boot image from a secure location. According to various aspects, a computing device may include a processor, a secure read-only location for storing at least one secure boot image, and a memory including initiation and recovery instructions for initiating a boot cycle of the computing device. The instructions, when executed by the processor, cause the computing device to initiate loading of a boot image, the boot image including multiple levels of boot code, determine, during the boot cycle, whether each of the multiple levels of boot code is usable or unusable, and, in response to determining a respective level of boot code is unusable, stop the boot cycle, load a corresponding secure level of boot code from the secure read-only location, replace the respective level of boot code with the secure level of boot code, and resume the same boot cycle at a last known level of boot code determined to be usable. Other aspects include corresponding systems, methods, and computer program products for implementation of the foregoing features performed by the computing device.

In various aspects, a computer-implemented method may include initiating a boot cycle to load an operating system on a computing device, verifying a first level of boot code during the boot cycle, determining, by the computing device, a second level of boot code is unusable during the boot cycle, in response to determining the second level of boot code is unusable, stopping the boot cycle and obtaining a secure level of boot code from a secure read-only location, replacing the second level of boot code with the secure level of boot code to repair the boot cycle, and resuming the same boot cycle at the end of the verified first level of boot code. The secure read-only location may include, for example, an integrated circuit chip located on a system control board of a computer. The method may be initiated automatically on the detection of a boot failure, or on indication by a user (for example, via a dedicated button or keystroke during boot-up of the machine or computer). Other aspects include corresponding systems, apparatuses, and computer program products for implementation of the computer-implemented method.

In various aspects, a machine-readable medium may include machine-executable instructions stored thereon, which when executed by a machine or computer cause the machine or computer to perform a method, including initiating an execution of a boot cycle from a memory medium of a computing device, the boot cycle comprising multiple levels of boot code, determining, during the boot cycle whether each of the multiple levels of boot code is usable or unusable, and, in response to determining a respective level of boot code is unusable, stopping the boot cycle, loading a corresponding secure level of boot code from a secure read-only location in the computing device, replacing the respective level of boot code with the secure level of boot code, and resuming the same boot cycle at a last known level of boot code determined to be usable.

It is understood that other configurations of the subject technology will become readily apparent to those skilled in the an from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

Modern computers may include various backup and recovery mechanisms. Due to data corruption (for example, resulting from malicious software or hardware failures), it may be desirable to replace or repair an image of firmware or an operating system on a bootable hard drive or other storage mechanism. However, restoring the image using a recovery image may be a complex, if not a difficult process, and the recovery image itself may also be susceptible to data corruption. Thus, recovering a corrupted image may inevitably require intervention by a computer technician at substantial cost. The subject technology provides a secure bank of data that a user can turn to when everything else fails, alleviating the need for intervention by the user or computer technician.

Figure 1:
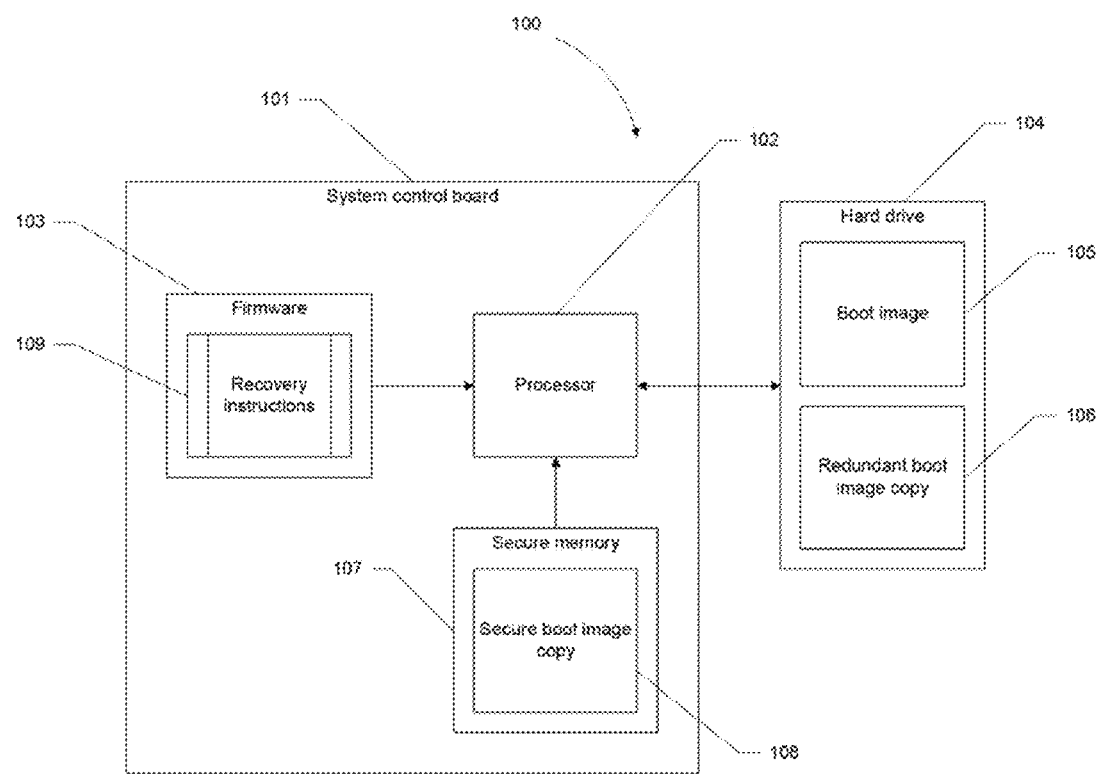
FIG. 1 is an exemplary diagram of an apparatus and system for loading a boot image, including a firmware and secure memory location, according to one aspect of the subject technology.

FIG. 1 is an exemplary diagram of an apparatus and system for loading a boot image, including a firmware and secure memory location, according to one aspect of the subject technology. According to one aspect, a computer system 100 may include a system board 101 (for example, a motherboard), including a processor 102 and one or more firmware 103, and a hard drive 104. System 100 may be configured to startup operations using one or more boot images 105 spanning both firmware, kernel partitions, and/or a root file system of an operating system, with each boot image including multiple levels of boot code. For example, a boot image 105 may be stored on hard drive 104. In other aspects, one or more redundant boot images 106 may be included (for example, on a hidden partition of hard drive 104 or other rewritable memory) which correspond to and are redundant to boot image 105, providing a copy of boot image 105 should it fail.

System 100 may also include a secure memory location 107 associated with, or located on system board 101. For example, secure memory location 107 may be implemented as an integrated circuit chip located on, or integrated with, system control board 101. This secure bank of data may be implemented as a secure read-only memory hardware that stores one or more secure images 108, including a trusted boot code for restoring all or a portion of a boot path of a computer-enabled device. In one aspect, secure image 108 may provide a copy of boot image 105. Because it is a read-only copy of a known good image, and separated from the kernel and/or hard disk, the boot code therein may be considered trusted. In some aspects, on a boot failure, a recovery using secure image 108 may be triggered by a hardware switch or by a series of keystrokes during the boot cycle. In other aspects, as described below, secure memory location 107 may be automatically accessed by system 100 on the boot failure.

Firmware 103 may include initiation and recovery instructions 109, that, when executed by the processor, may be operable to cause the processor to load and perform a verification of a boot image. In the case boot image 105 or one or more portions thereof, is determined by the verification to be unusable (for example, corrupted), instructions 109 may access secure location 107 to load the operating system using secure image 108. Alternatively, on determining boot image 105 cannot be verified or is unusable, instructions 109 may attempt to load and perform a second verification of a redundant boot image 106. In the case redundant boot image 106 is also determined by the second verification to be unusable, the software may load and execute secure boot image 108.

As system 100 is booted, a cryptographic key may be used to verify the boot image, or a portion of the boot image. In this regard, system 100 may perform a checksum at each level up from a core trusted piece of boot code, and, if a code abnormality and/or boot failure is determined, a redundant copy of the image or one or more portions thereof, may be loaded to recover the boot path. Redundant image 106 (and secure image 108) may include a copy of the entire image or one or more levels of boot code, and may also be verified with the cryptographic key. As previously described, if the redundant copy is determined to be unusable, system 100 may recover the level of boot code from secure memory location 107.

Boot image 105, redundant boot image 106, and secure boot image 108 may include a boot code for a single boot level, or may include code partitioned into multiple levels. Since boot code may be restored on a level by level basis, once an unusable image, or portion thereof, is determined, the process may be operable to stop the boot cycle, access redundant copy 106 and/or secure copy 108 to repair that portion of code, and then resume the boot cycle at the last known verifiable level. For example, if there is a failure at the firmware level (EC to read-only to rewritable) the process may restart at the next firmware level. However, if the kernel fails then it may restart the boot verification process at the end of the firmware levels. During the recovery process, if redundant boot code stored, for example, on a recovery partition of a hard drive is also found to be unusable, the system (automatically, or on a user-initiated keystroke or switch) may copy the relevant portion of secure image 108 from secure location 107 to hard drive 104 or the like, replacing the unusable redundant boot code. The redundant boot code may be further checked using the cryptographic key to verify that the secure image was copied correctly and/or that there are no hardware errors.

As described previously, secure location 107 may include a non-removable chip, for example, eMMC, EEPROM, NAND flash, or the like. Alternatively, the secure recovery image may be stored in a host protected area of a solid state drive, hidden from the operating system. For example secure recovery image 108 may be stored on a write-protected partition of an eMMC of the drive. In another aspect, secure recovery image 108 may be stored on a secure digital (SD) or micro SD card. A computer implementation of system 100 may include a hidden slot inside the device, for example, inside the battery compartment. A recovery image may be updated by removing it from the computer and programming it on a separate computer (or by inserting it into the normal SD card slot on the device itself). In one example, an SD or micro SD recovery image may be kept separate from the main memory medium of the device, with system 100 configured ignore the advertisement of the memory medium's write protect switch to the operating system.

According to one aspect, an additional circuit may be provided with the SD device to prevent intrusion. This circuit may be latched in either an enabled state or disabled state. Once a state has been selected, it may stay active (for example, cannot be changed) until the system resets. When the circuit is enabled, the SD card may be electrically connected so that system 100 can boot from it. When the circuit is disabled, the SD card may be electrically disconnected, and the system may not boot to or write from it, protecting it from being altered by a malfunctioning, operating system or remote attacker. In one aspect, the circuit state may be selected via a read-only boot stub firmware (for example, in firmware 103). If system 100 determines that a recovery mode has been selected, it may enable the circuit. Otherwise, if it determines that the firmware should be rewritable, it may disable the circuit. In one example, the circuit state may be selected if a recovery button is activated on hardware associated with system 100.

The previously described additional circuitry may also be included in an integrated circuit and/or full chip protection implementation so that the chip is operable only in recovery mode. In this regard, the additional circuit may control the write protect state of the chip so that the chip is writable in recovery mode, but read-only in other modes. To this end, the chip may be protected from accidental or malicious alteration during, normal boot, but may still allow updating the recovery image when in recovery mode.

Figure 2:
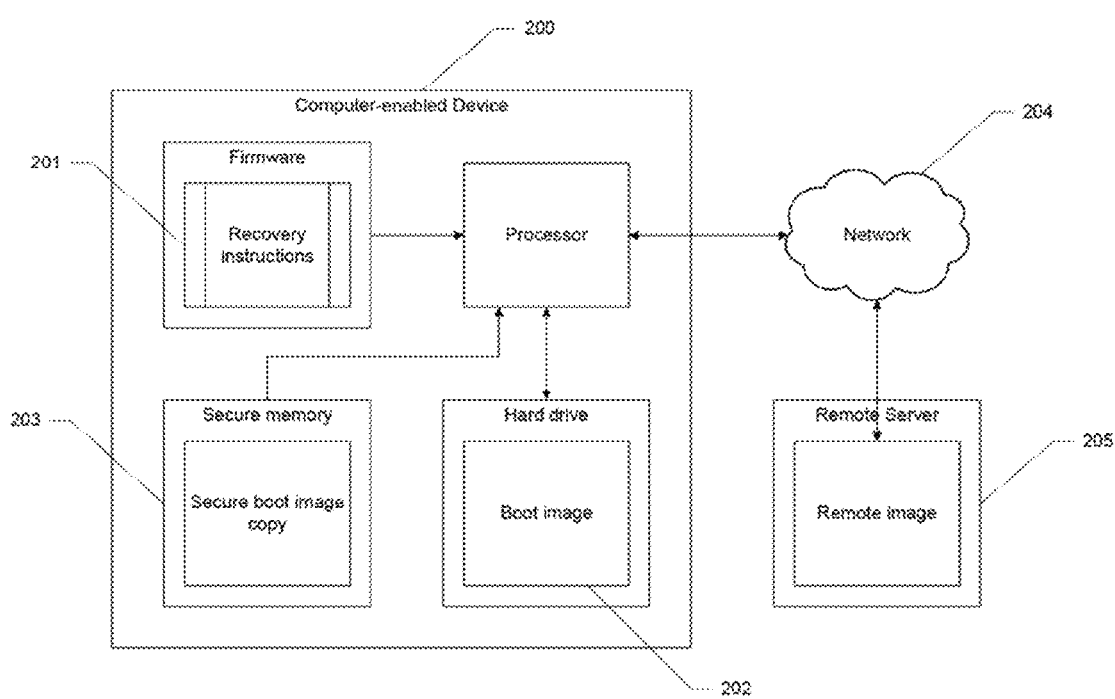
FIG. 2 is an exemplary diagram of an apparatus and system for restoring an operating system over a network according to one aspect of the subject technology.

FIG. 2 is an exemplary diagram of an apparatus and system for restoring an operating system over a network according to one aspect of the subject technology. In some aspects, the previously described recovery mechanism may only install enough information to get to the operating system to a known good state, wherein the remainder of a core image may be pulled from other sources. For example, a computer-enabled device 200 may include one or more hoot images on a firmware 201, memory medium 202 (for example, a hard drive), and/or secure memory 203 to restore the operating system to a default version (for example, as discussed with reference to FIG. 1). In one aspect, the one or more boot images may include a network recovery image of a default operating system, including a limited feature set with network accessibility. After installation, the default operating system may automatically, or on user action, initiate a predefined sequence to pull updates from over a network 204 in order to update the operating system to the latest version. Updates to the operating system may be provided by one or more remote servers 205. In this manner, the recovery process may first restore the computer to a usable place within a short period of time (for example, 30 seconds for a fast boot path) using the onboard recovery process, and then update the operating system in one or more background processes, providing the up-to-date operating system for use the next time the user reboots the computer.

In some aspects, as further operating system and firmware updates are released, secure image 108 may be automatically updated. In this manner, when the system needs to recover, the operating system and/or firmware can recover to an updated state instead of that which was available when the device already shipped from the factory. This may be significant in that the original factory software may have had security vulnerabilities at the time of its release. In a further aspect, system 100 may be configured to prevent the installation of an operating system that is older than the secure image. In this regard, on an attempt to install an operating system, a check may be performed against, boot image 105, redundant image 106, or secure image 107 to verify that the operating system is at least as old as the image. The recovery image may also be able to disable the operating system protection so it can install the operating system and firmware which it contains, or it may include the previously described network recovery image so that it can fetch a current operating system and firmware over a network.

Figure 3:
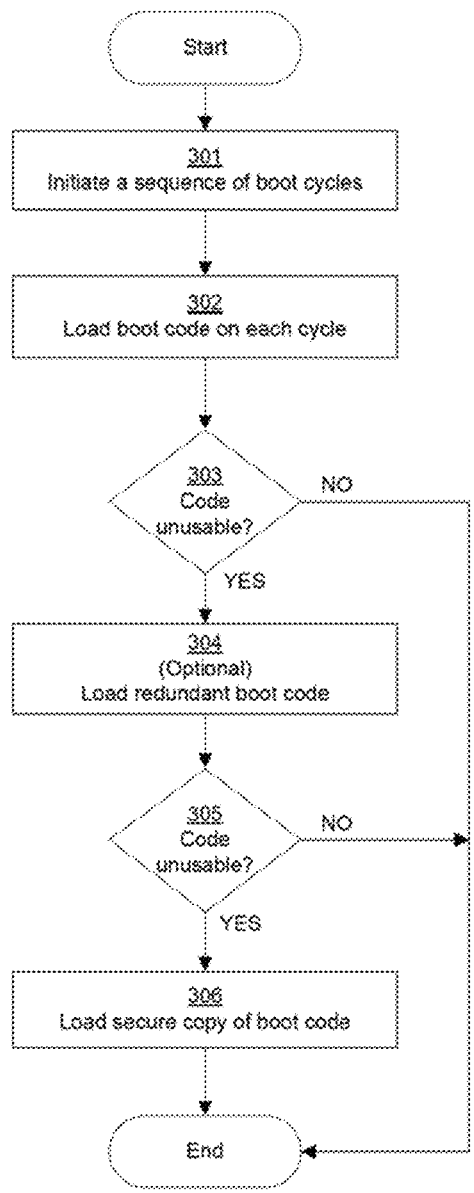
FIG. 3 is a flowchart illustrating an exemplary process for loading a boot image from a secure location according to one aspect of the subject technology.

FIG. 3 is a flowchart illustrating an exemplary process for loading a boot image from a secure location according to one aspect of the subject technology. In step 301, system 100 initiates a sequence of boot cycles, with each cycle loading a level of boot code from a memory medium. In step 302, system 100 attempts to load and execute boot code for a boot cycle, and, in step 303, determines whether the boot code is usable. In one aspect, a verification of the code may be performed to determine whether it is usable to boot the device. In another aspect, the determination may result from a verification that the boot cycle did not fully execute, failed or produced errors, was corrupted, or the like.

If the boot code is usable, it is executed. Otherwise, in optional step 304, on determining the boot image is determined by the verification to be unusable, system 100 attempts to load a redundant copy of the boot code. As described previously, this copy may be loaded from a hidden partition on hard drive 104 or other memory medium. In some aspects, one or more cycles of boot code, including a redundant copy, may be loaded from a firmware, for example, a read/write firmware. If system 100 attempts to load a redundant copy of boot code, in step 305, system 100 will make a determination as to whether the redundant copy is also unusable. If the redundant boot code is usable it is executed and the process ends. Otherwise, in step 306, on determining the both original and redundant boot images are determined to be unusable, system 100 attempts to load a secure copy of the boot code from a secure location. In some aspects, the secure location used to load the secure image is not associated with the memory medium. To this end, if a redundant copy is stored on one memory medium such as a hard drive or memory stick, the secure location may be implemented as a read only firmware, for example, in an integrated circuit.

Figure 4:
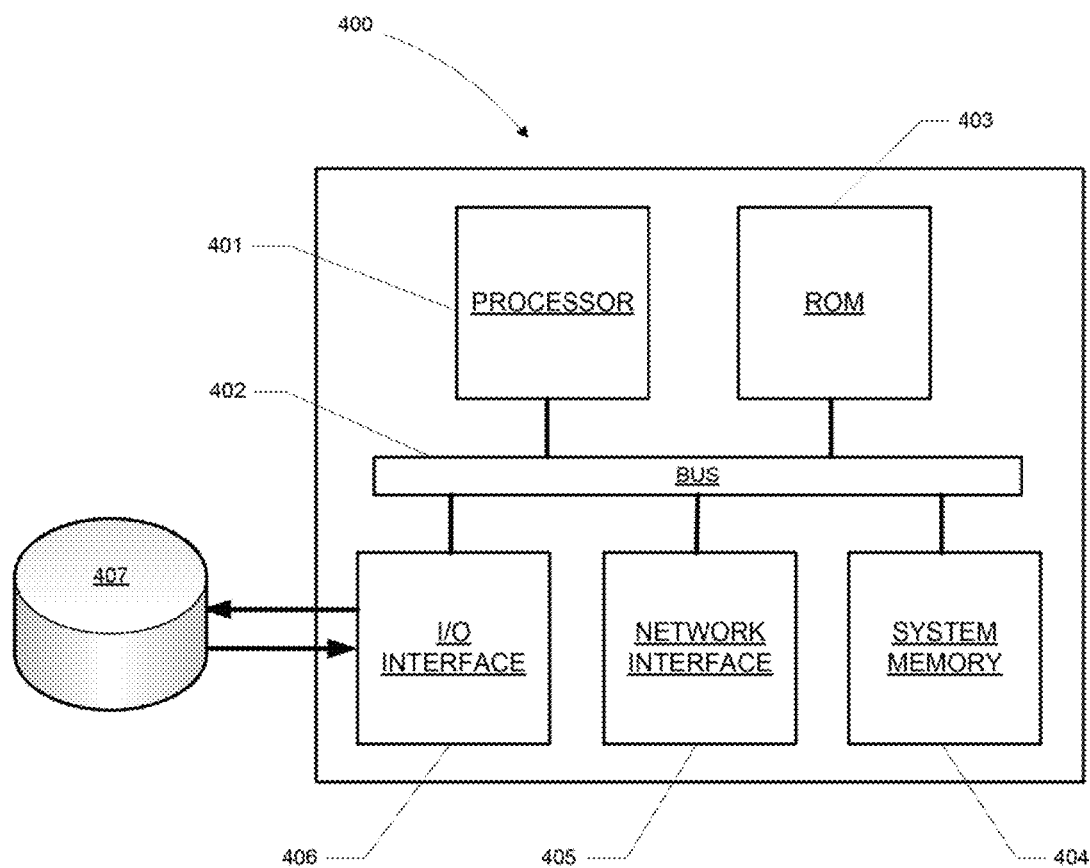
FIG. 4 is a diagram illustrating an exemplary server system for loading a boot image from a secure location, including a processor and other internal components, according to one aspect of the subject technology.

FIG. 4 is a diagram illustrating an exemplary server system for loading a boot image from a secure location, including a processor and other internal components, according to one aspect of the subject technology. In some aspects, a computerized device 400 (for example, computer system 100 or the like) includes several internal components such as a processor 401, a system bus 402, read-only memory 403, system memory 404, network interface 405, I/O interface 406, and the like. In one aspect, processor 401 may also be communication with a storage medium 407 (for example, a hard drive, database, or data cloud) via I/O interface 406. In some aspects, all of these elements of device 400 may be integrated into a single device. In other aspects, these elements may be configured as separate components.

Processor 401 may be configured to execute code or instructions to perform the operations and functionality described herein, manage request flow and address mappings, and to perform calculations and generate commands. Processor 401 is configured to monitor and control the operation of the components in server 400. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on a ROM within processor 401. Likewise, one or more sequences of instructions may be software stored and read from system memory 405, ROM 403, or received from a storage medium 407 (for example, via PO interface 406). ROM 403, system memory 405, and storage medium 407 represent examples of machine or computer readable media on which instructions/code may be executable by processor 401. Machine or computer readable media may generally refer to any medium or media used to provide instructions to processor 401, including both volatile media, such as dynamic memory used for system memory 404 or for buffers within processor 401, and non-volatile media, such as electronic media, optical media, and magnetic media.

In some aspects, processor 401 is configured to communicate with one or more external devices (for example, via I/O interface 406). Processor 401 is further configured to read data stored in system memory 404 and/or storage medium 407 and to transfer the read data to the one or more external devices in response to a request from the one or more external devices. The read data may include one or more web pages and/or other software presentation to be rendered on the one or more external devices. The one or more external devices may include a computing system such as a personal computer, a server, a workstation, a laptop computer, PDA, smart phone, and the like.

In some aspects, system memory 404 represents volatile memory used to temporarily store data and information used to manage device 400. According to one aspect of the subject technology, system memory 404 is random access memory (RAM) such as double data rate (DDR) RAM. Other types of RAM also may be used to implement system memory 504. Memory 404 may be implemented using a single RAM module or multiple RAM modules. While system memory 404 is depicted as being, part of device 400, those skilled in the art will recognize that system memory 404 may be separate from device 400 without departing from the scope of the subject technology. Alternatively, system memory 404 may be a non-volatile memory such as a magnetic disk, flash memory, peripheral SSD, and the like.

I/O interface 406 may be configured to be coupled to one or more external devices, to receive data from the one or more external devices and to send data to the one or more external devices, I/O interface 406 may include both electrical and physical connections for operably coupling I/O interface 406 to processor 401, for example, via the bus 402. I/O interface 406 is configured to communicate data, addresses, and control signals between the internal components attached to bus 402 (for example, processor 401) and one or more external devices (for example, a hard drive). I/O interface 406 may be configured to implement a standard interface, such as Serial-Attached SCSI (SAS), Fiber Channel interface, PCI Express (PCIe), SATA, USB, and the like. I/O interface 406 may be configured to implement only one interface. Alternatively, I/O interface 406 may be configured to implement multiple interfaces, which are individually selectable using a configuration parameter selected by a user or programmed at the time of assembly, I/O interface 406 may include one or more buffers for buffering transmissions between one or more external devices and bus 402 and/or the internal devices operably attached thereto.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying, method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations. Or one Of more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later conic to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computing device, comprising:
a processor;
a secure read-only location for storing at least one secure boot image; and
a memory including initiation and recovery instructions for initiating a boot cycle of the computing device that, when executed by the processor, cause the computing device to:
initiate loading of a boot image, the boot image including multiple levels of boot code;
determine, during the boot cycle, whether each of the multiple levels of boot code is usable or unusable; and in response to determining a respective level of boot code is unusable, stop the boot cycle, load a corresponding secure level of boot code from the secure read-only location, replace the respective level of boot code with the secure level of boot code, and resume the same boot cycle at a last known level of boot code determined to be usable.

2. The computing device of claim 1, wherein the instructions, when executed by the processor, further cause the computing device to:
load, before stopping the boot cycle, a respective redundant level of boot code, and determining that the redundant level of boot code is unusable, wherein the corresponding secure level of boot code is loaded in response to determining that the redundant level of boot code is unusable.

3. The computing device of claim 1, wherein each of the multiple levels of boot code is verified up from a core trusted piece of boot code.

4. The computing device of claim 1, wherein causing the computing device to determine whether each of the multiple levels of boot code is usable or unusable comprises causing the computing device to check each of the multiple levels of boot code using a cryptographic key.

5. The computing device of claim 1, wherein the instructions, when executed by the processor, further cause the computing device to verify the secure level of boot code.

6. The computing device of claim 1, wherein the secure read-only location comprises an integrated circuit chip located on a system control board associated with the computing device.

7. The computing device of claim 1, wherein the secure read-only location comprises a hidden partition of a storage drive associated with the computing device, the hidden partition being hidden from an operating system of the computing device.

8. The computing device of claim 1, wherein the secure read-only location comprises a host protected area of a solid state drive associated with the computing device.

9. The computing device of claim 1, wherein the secure level of boot code is loaded in response to a user-initiated keystroke.

10. The computing device of claim 1, wherein the instructions, when executed by the processor, further causes the computing device to:
restore an operating system to a default state including network accessibility; and
update the operating system of the computing device to a latest version from a remote network source.

11. A computer-implemented method, comprising:
initiating a boot cycle to load an operating system on a computing device;
verifying a first level of boot code during the boot cycle;
determining, by the computing device, a second level of boot code is unusable during the boot cycle;
in response to determining the second level of boot code is unusable, stopping the boot cycle and obtaining a secure level of boot code from a secure read-only location;
replacing the second level of boot code with the secure level of boot code to repair the boot cycle; and
resuming the same boot cycle at the end of the verified first level of boot code.

12. The computer-implemented method of claim 11, further comprising:
determining a redundant level of boot code corresponding to the second level of unusable boot code is also unusable before replacing the second level of unusable boot code with the secure level of boot code.

13. The computer-implemented method of claim 11, further comprising:
loading a default operating system from a memory medium associated with the computing device using the repaired boot cycle.

14. The computer-implemented method of claim 11, further comprising:
verifying each level of boot code up from a core trusted piece of boot code.

15. The computer-implemented method of claim 11, further comprising:
performing a verification of each level of boot code using a cryptographic key.

16. The computer-implemented method of claim 11, wherein the secure read-only location comprises an integrated circuit chip located on a system control board associated with the computing device.

17. The computer-implemented method of claim 11, wherein the secure read-only location comprises a hidden partition of a storage drive associated with the computing device, the hidden partition being hidden from an operating system of the computing device.

18. The computer-implemented method of claim 11, wherein the secure read-only location comprises a host protected area of a solid state drive associated with the computing device.

19. The computer-implemented method of claim 11, wherein the secure level of boot code is replaced in response to a user-initiated keystroke.

20. A non-transitory machine-readable medium having machine-executable instructions stored thereon, which when executed by a machine or computer cause the machine or computer to perform a method, comprising:
initiating an execution of a boot cycle from a memory medium of a computing device, the boot cycle comprising multiple levels of boot code;
determining, during the boot cycle, whether each of the multiple levels of boot code is usable or unusable; and
in response to determining a respective level of boot code is unusable, stopping the boot cycle, loading a corresponding secure level of boot code from a secure read-only location in the computing device, replacing the respective level of boot code with the secure level of boot code, and resuming the same boot cycle at a last known level of boot code determined to be usable.

* * * * *